United States Patent [19]

Cota et al.

[11] Patent Number: 4,741,120
[45] Date of Patent: May 3, 1988

[54] SELF-ILLUMINATING FISHING LURE

[76] Inventors: Albert O. Cota, Suite A-331, 5460 White Oak Ave., Encino, Calif. 91316; Dennis J. Copeland, 2948 E. Sierra Madre Blvd., Pasadena, Calif. 91107

[21] Appl. No.: 15,232
[22] PCT Filed: May 14, 1985
[86] PCT No.: PCT/US85/00877
§ 371 Date: Jan. 12, 1987
§ 102(e) Date: Jan. 12, 1987
[87] PCT Pub. No.: WO86/06584
PCT Pub. Date: Nov. 20, 1986

[51] Int. Cl.⁴ ............................................. A01K 85/00
[52] U.S. Cl. ..................... 43/17.6; 43/17.5; 43/42.33; 43/42.53
[58] Field of Search ............... 43/17.5, 17.6, 42.33, 43/42.39, 42.53

[56] References Cited

U.S. PATENT DOCUMENTS

| 272,317 | 2/1883 | Pzlueger | 43/17.6 |
| 1,380,876 | 6/1921 | Warden | 43/17.6 |
| 3,895,455 | 7/1975 | Johnston | 43/17.6 |
| 3,922,811 | 12/1975 | Ellingson | 43/42.39 |
| 3,955,304 | 5/1976 | Reid | 43/42.34 |
| 4,556,930 | 12/1985 | Mori | 43/17.5 |
| 4,581,839 | 4/1986 | Mattison | 43/17.6 |
| 4,617,751 | 10/1986 | Johansson | 43/17.6 |
| 4,638,584 | 1/1987 | Lindsay | 43/17.6 |

Primary Examiner—M. Jordan
Attorney, Agent, or Firm—Albert O. Cota

[57] ABSTRACT

A self-illuminating fishing lure (10) having a constant light source that is produced by a tritium capsule (12) encapsulated within a hard translucent fishing lure body (14). The tritium capsule (12) has an inside surface coated with phosphorus and a hermetically sealed quantity of tritium which is an isotope of hydrogen. The light from the capsule is produced by the continuous action of low energy electrons, emitted by the tritium, striking the phosphor. The tritium capsule (12) has a half-life of over ten years. Therefore, for all practical purposes, the fishing lure (10) will be self-illuminating for all of its useful life. The fishing lure (10) may be used at any depth, but it is especially effective for catching fish located in deep or murky waters.

5 Claims, 2 Drawing Sheets

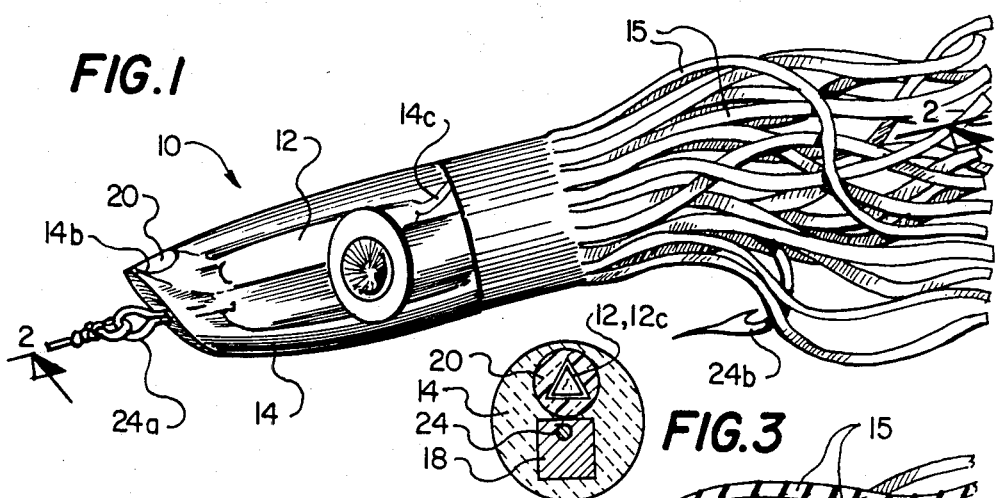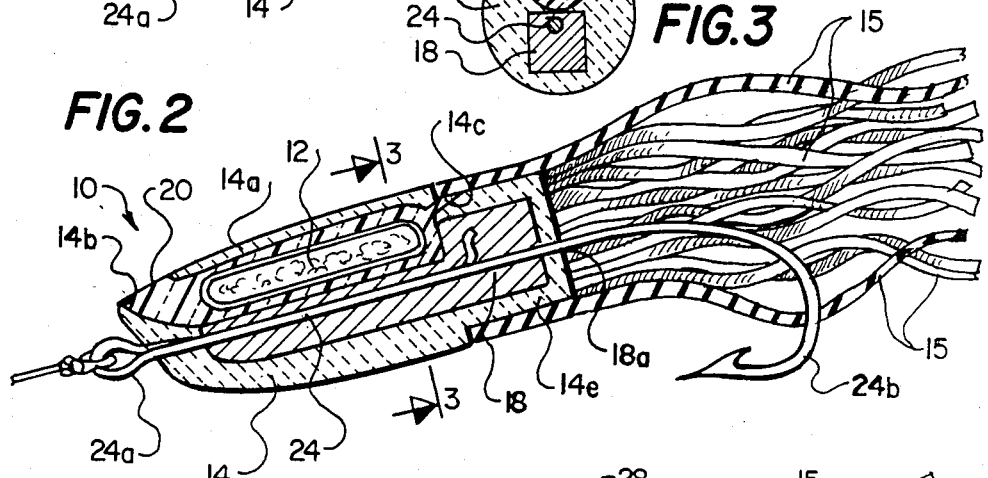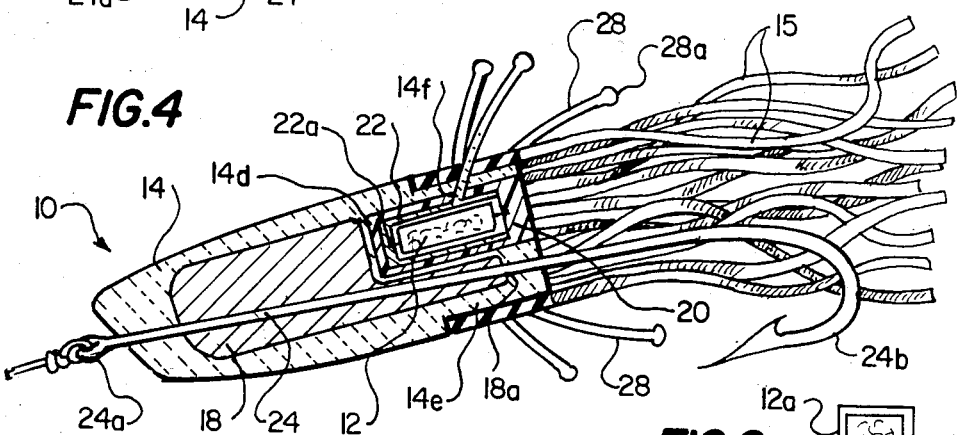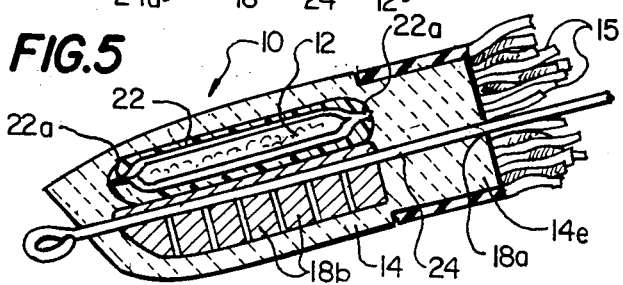

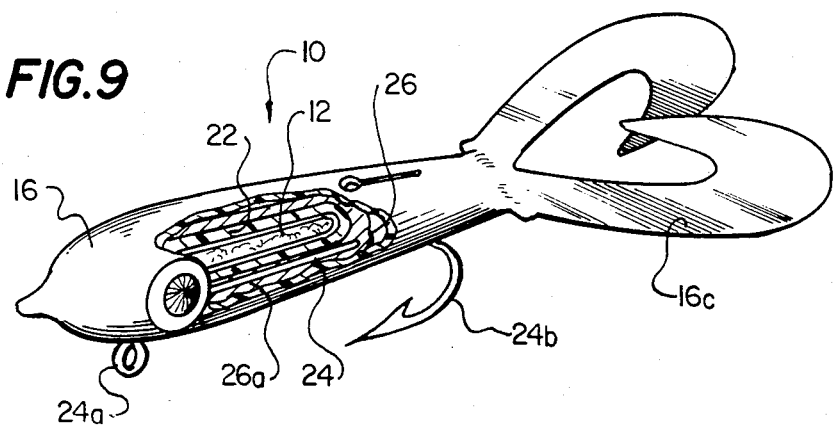
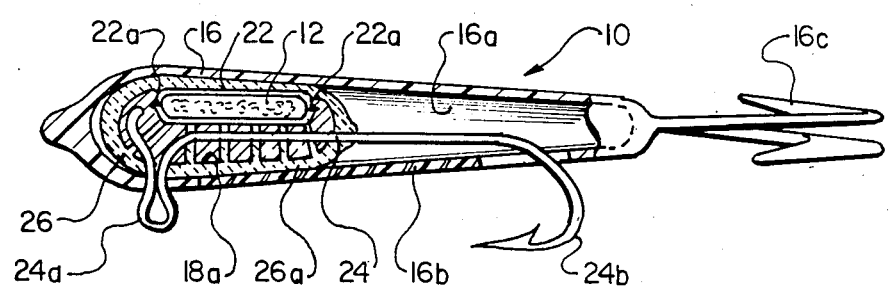
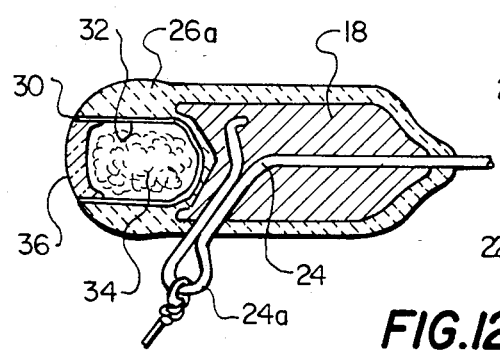
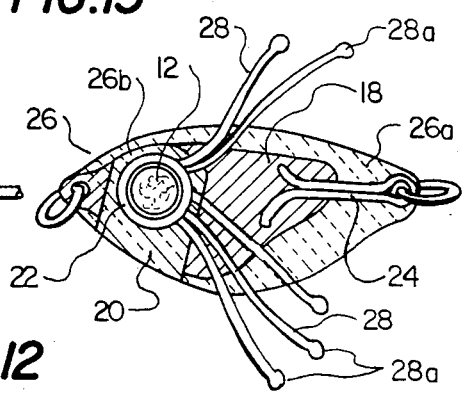
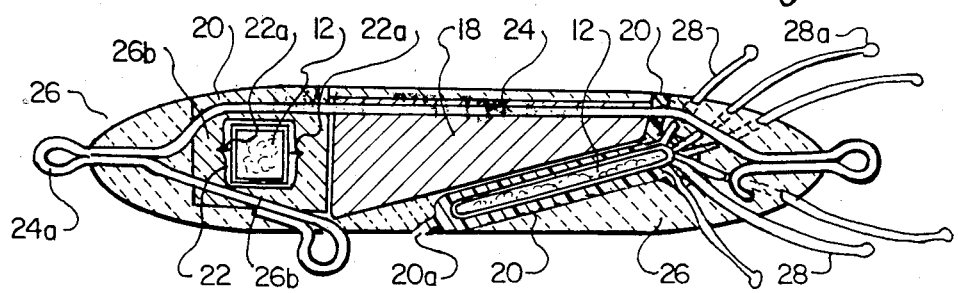

SELF-ILLUMINATING FISHING LURE

TECHNICAL FIELD

The invention pertains to the general field of artificial fishing lures and more particularly to fishing lures incorporating a self-illuminating light source.

BACKGROUND ART

Fishing lures have been used by sport fishermen for many years for both commercial gain and enjoyment. To be a successful sport fisherman, requires a number of attributes including: skill, luck, and a knowledge of the habits and peculiarities of the specific fish being sought. With these attributes, the fisherman should also have at his disposal a good selection of fishing lures in a variety of sizes, colors and animated actions.

The art of fishing lures has progressed to a point where specific lures are designed to attract a specific specie of fish under a given set of environmental conditions. As part of the design criteria some lures are designed to operate best at specified water depths and are equipped with a variety of embellishments such as actual fish markings, fluorescent paint and light reflectors. In some instances, particularly when the lure is used at lower water depths, a light tube is attached to the fish line to further aide in attracting the fish to the lure. Such a light tube is manufactured by the American Cyanamid Company and is sold under the trademark LUNKER LIGHTS.

The light tube is comprised of a sealed resilient tube containing a chemical formulation. When the tube is bend, snapped and shaken a chemical reaction occurs that causes a light to be emitted for up to six hours. After the tube is glowing, it is attached to the fish line at selectable distances from the lure. When the light is depleted, the light tube is removed from the line and discarted.

A search of the prior art did not disclose any patents or publications that read on the claims of the instant invention. However, the following U.S. patents are provided to indicate the current state-of-the-art in artificial fishing lures.

| U.S. PAT. NO. | INVENTOR | ISSUED |
| --- | --- | --- |
| 4,349,979 | Strantz | 21 September 1982 |
| 4,345,399 | Guzik | 24 August 1982 |
| 4,337,591 | Gell | 6 July 1982 |

The Strantz patent discloses a device for maintaining a live bait fish, such as a minnow, on a fishing member having barbs at one end and a plurality of transverse holes that permit a fish hook to be attached. The barbs lodge in the gills of the minnow causing the fish hook to be firmly attached to the minnow's mouth.

The Guzik patent discloses a sonic fishing lure employing a tubular body that defines a longitudinal flow-through chamber for the passing water. Within the chamber is a variable elastic member that can be altered to produce a variety of sonic effects as the lure is pulled through the water.

The Gell patent discloses a fishing lure comprised of a center body section having a fish hook connecting means, a plurality of interchangeable depth calibrated weights, and two body halves adapted to encase the center body section. A plurality of interchangeable clamps, such as bands, are provided to hold the two body halves together while the lure is being used.

DISCLOSURE OF THE INVENTION

The self-illuminating fishing lure is designed to be used by both sport and commercial fishermen to catch fish primarily in deep or murky waters. The principal novelty of the invention is a self-illuminating light source that is produced by a tritium capsule permanently encapsulated within the lure body. The tritium capsule has an inside surface that is coated with phosphorus and a quantity of hermetically sealed tritium which is an isotope of hydrogen. A phosphorescent glow is produced by the continuous action of low energy electrons, that are emitted by the tritium, striking the phosphor coating. The illumination process is similar to that used to illuminate the face plate of a television picture tube.

The tritium capsule has a half-life of over ten years. Thus, for all practical purposes, the fishing lure will have a self-illuminating glow for all of its useful life.

The self-illuminating feature of the fishing lure may be achieved by either: encapsulating, within the lure body the tritium capsule or the lure body may serve as the capsule for the tritium. In the later design, the inside of the lure body capsule is deposited with phosphorus and the tritium is inserted and sealed within the capsule. A smaller fishing lure assembly may also be employed that has encapsulated therein a tritium capsule, a lure weight, and a fish hook and line assembly. The fishing lure assembly is designed to be inserted inside one of the many available resilient body lures.

The primary object of the self-illuminating fishing lure is to catch fish located in deep or murky waters. However, tests in shallow waters have also proven the general fish attracting qualities of the lure.

Another object of the lure is to have a practical as well as an aesthetic lure that is attractive to fishermen.

In addition to the above, it is also an object of the invention to have a self-illuminating lure that:
  can be manufactured in an unlimited variety of shapes and sizes,
  is cost-effective to manufacture and use, is reliable, requires no maintenance or operating costs, and
  can be made to produce a light a variety of luminous colors i.e., white, green or yellow.

These and other objects and advantages of the present invention will become apparent from the subsequent detailed description of the invention and the claims taken in conjunction with the accompanying drawings.

BRIEF DESCRIPTION OF THE DRAWINGS

FIG. 1 is a perspective view of the preferred embodiment of the self-illuminating fishing lure shown with a typical hard translucent fishing lure body.

FIG. 2 is a sectional side view of the lure with a tritium capsule located in a tritium cavity surrounded by a resilient shock absorbing material.

FIG. 3 is a cross-sectional view taken along section 3—3 of FIG. 2 showing the placement of the tritium cell and the lure weight in the lure body.

FIG. 4 is a side sectional view of the lure with a tritium capsule, encased in a resilient shock absorbing sleeve, within a tritium module cavity and a plurality of fiber optic strands projecting from the lure body.

FIG. 5 is a side sectional view of the lure with a tritium module and a perforated lure weight encapsulated within a hard translucent body.

FIG. 6 is a cross-sectional view of the tritium cell in a square/rectangular configuration.

FIG. 7 is a cross-sectional view of the tritium cell in a round configuration.

FIG. 8 is a cross-sectional view of the tritium cell in a triangular configuration.

FIG. 9 is a perspective view of the second embodiment of the self-illuminating fishing lure shown with a typical resilient translucent fishing lure body.

FIG. 10 is a sectional side view of the resilient lure incorporating a fishing lure assembly having encapsulated therein a tritium capsule encased in a resilient shock absorbing sleeve and a perforated lure weight.

FIG. 11 is a sectional side view of a fishing lure assembly having a tritium gas hermetically encapsulated within a phosphor coated tritium cavity located within the hard translucent body.

FIG. 12 is a sectional side view of a larger fishing lure assembly having encapsulated therein a tritium capsule encased in a resilient shock absorbing sleeve within a tritium cavity, a second tritium capsule surrounded within a tritium cavity by a resilient shock absorbing material, and a plurality of fiber optic strands projecting from the lure body.

FIG. 13 is a sectional side view of a fishing lure assembly having encapsulated therein a tritium capsule encased in a resilient shock absorbing sleeve within a tritium cavity and a plurality of fiber optic strands projecting from the lure body.

BEST MODE FOR CARRYING OUT THE INVENTION

The best mode for carrying out the inventon of the self-illuminating fishing lure 10 is presented in terms of two major embodiments: the first, which is considered the preferred embodiment, is shown in FIGS. 1 through 5. This embodiment is comprised of a self-illuminating lighting means, such as a tritium capsule 12, that is encapsulated within a hard translucent fishing lure body 14 that may be molded of any hard translucent material such as an acrylic methyl methacrylate, sold under the trademark PLEXIGLAS and LUCITE, or a polycarbonate, sold under the trademark LEXAN. Several species of the preferred embodiment are described. These species vary in the size and shape of the lure body and in the configuration and location of the tritium capsule within the lure body.

The second embodiment, shown in FIGS. 9 through 13, is a self-illuminating fishing lure 10 that is comprised of a resilient translucent fishing lure body 16 that may be molded of any resilient translucent material such as synthetic rubber or a polystyrene.

The lure body 16 has a lure cavity 16a into which is inserted a fishing lure assembly 26. The assembly 26 is comprised of a fishing lure body insert 26a that has encapsulated therein a self-illuminating lighting means, such as a tritium capsule 12. Several species of the fishing lure assembly 26 are also described. These species vary in the size and shape of the lure body 16, the size and shape of the insert 26a and in the configuration and location of the tritium capsule 12 within the insert.

As shown in FIGS. 6, 7 and 8 respectively, the tritium capsule 12 may be constructed with a square/rectangular 12a, round 12b, or triangular 12c cross-sectional area. The capsule may also vary in length and cross sectional area or may be in the form of a cube, as shown in FIG. 11, or a sphere as shown in FIG. 12.

The principal novelty inherent in all the embodiments of the self-illuminating fishing lure 10 is in its ability to maintain a constant light or glow for a period in excess of ten years. This glow is derived from a light emitting radioactive substance, such as tritium, that is encapsulated within the tritium capsule 12.

Tritium is a hydrogen isotope of mass number three, having two neutrons and a proton in its nucleus. The tritium is radioactive, has a half-life of 12.4 years and decays with the emission of an electron called a beta ray.

When tritium is encapsulated into a hermetic capsule that is constructed of glass or a resilient material and has its inside walls deposited with phosphor, the beta rays (electrons) striking the phosphor walls cause a phosphorescent glow to be emitted from the capsule. The process is similar to the glow that is emitted from the face plate of a TV picture tube when the set is turned on. In this case, the glow occurs when the electrons emitted from the CRT electron gun strike the inside of the phosphor coated TV face plate.

The first specie of the preferred embodiment, as shown in FIG. 2, is comprised of a hard translucent fishing lure body 14 having a tritium capsule bore 14a that has a diameter in excess of the tritium capsule cross section. Into this bore is initially inserted, through a front opening bore 14b, a resilient shock absorbing material 20 such as a clear silicone compound. The insertion of the material 20 is continued until a small quantity exudes through the back air hole 14c. Thus, indicating that the bore 14a is completely filled. Before the material sets, a tritium capsule 12 is inserted into the center of the bore 14a making sure that the capsule is completely surrounded by the shock absorbing material 20.

In this first specie, as best shown in FIG. 3, the tritium capsule 12 is located above an encapsulated solid lure weight 18. The lure weight has inserted longitudinally, through bore 18a, a fish hook and line assembly 24 that consists of a fishing line eyelet 24a and a fish hook 24b. The back end of the lure body 14 also has a recessed area 14e onto which is slipped a flexible skirt 15 to enchance the fish attracting attributes of the lure.

The second specie of the preferred embodiment, as shown in FIG. 4, is also comprised of a hard translucent fishing lure body 14. In this design, a tritium module cavity 14d is bored at the back end of the lure body 14 just behind a solid lure weight 18. The lure weight includes a bore 18a into which is inserted a fish hook and line assembly 24.

The tritium capsule 12, in this specie, is encased in a resilient shock absorbing sleeve 22. The two ends of the sleeve may be sealed by a sealing means 22a to provide further module hermeticity. After the tritium capsule is encased and sealed it is inserted into the tritium module cavity 14d and the cavity opening is sealed with the shock absorbing material 20.

This embodiment, in addition to a flexible skirt 15, also includes a plurality of light transmitting strands such as fiber optic strands 28. To use these strands 28, a plurality of strand bores 14f are drilled into the lure body 14 prior to the insertion of the encased tritium capsule. The strands are then placed into the bores so that one end of the strand is contiguous to the tritium capsule 12 and the other end extends outside the lure body 14. For best illumination results, a fiber termination light bead 28a is formed, by conventional means, at the end of the outwardly extending strand as shown in FIG. 4.

The third specie of the preferred embodiment is shown in FIG. 5. This embodiment differs only in the method of encapsulating the tritium module 12 and in the use of a perforated lure weight 18b that allows the illumination from the tritium capsule 12 to shine through.

In this design a tritium capsule 12 encased in a shock absorbing sleeve 22 and the perforated lure weight 18b are cast in place by a casting process. The casting process also includes a bore 18a - to allow a fishing line eyelet 24a and fish hook 24b -to be attached.

The second embodiment of the self-illuminating fishing lure 10 is shown in FIGS. 9 through 13.

The first specie of the second embodiment, as shown in FIG. 10 discloses a typical fishing lure assembly 26 located inside the lure cavity 16a of a resilient translucent fishing lure body 16. In this case, the fishing lure body insert 26a has a tritium module 12 encased in a resilient shock absorbing sleeve 22, a perforated lure weight 18b, and a fish hook and line assembly 24 cast in place.

FIGS. 11, 12 and 13 show three distinct species of the fishing lure assembly 26. In each design, the assembly is designed to be inserted into cavity 16a of the resilient translucent fishing lure body 16 or the assemblies 26 may be used "as is" functioning as an independent fishing lures.

The specie shown in FIG. 11 does not employ a tritium capsule 12; instead, the fishing lure body insert 26a serves as the capsule for the tritium 34. In this design, a body insert 26a is employed that has had previously casted at the rear section of the lure, a solid lure weight 18 and a fish hook and line assembly 24. At the front of the lure, a tritium cavity 30 is first bored. On the inner surface of this cavity is then deposited, by a deposition means, a coating of phosphorus 32. The tritium 34 is then inserted by an insertion means and the cavity opening is hermetically sealed by a hermetic sealing means 36.

The specie shown in FIG. 12 discloses a larger fishing lure body insert 26a that includes a forward and a centrally loated tritium capsule 12. The forward capsule which is in the shape of a cube, is encased in a resilient shock absorbing sleeve 22 and inserted into an insert tritium cavity 26b. The cavity opening is then filled and sealed with a resilient shock absorbing material 20.

The centrally located tritium capsule is inserted into a tritium capsule bore 26c that has been previously filled with a resilient shock absorbing material 20. This design also includes a plurality of fiber optic strands 28 projecting from the back of the lure body. The method of inserting and sealing the tritium capsule 12 and the fiber optic strands is as previously described for the preferred embodiment.

The final specie of the second embodiment is shown in FIG. 13. This specie includes a tritium capsule 12, in the shape of a sphere, that is encased in a resilient shock absorbing sleeve 22 and inserted into an insert tritium cavity 26b. As before, the cavity opening is filled and sealed with a resilient shock absorbing material 20. This design also includes a perforated lure weight 18b and a plurality of fiber optic strands 28.

An alternative method to achieve a self-illuminating fishing lure 10, without the use of tritium, is to employ a phosphor capsule (not shown). In this design, the phosphor capsule is encapsulated in the lure body 14 as previously discussed. Just prior to casting, the 10 against a bright light, such as a flashlight, for a few seconds. The lure will produce a useful fish attracting phosphorescent glow that will last for ten to fifteen minutes.

Although the invention has been described in complete detail and pictorally shown in the accompanying drawings, it is not to be limited to such detaile since many changes and modifications may be made to the invention without departing from the spirit and scope thereof. Hence, the invention is described to cover any and all modifications and forms which may come within the language and scope of the claims.

We claim:

1. A method for manufacturing a self-illuminating fishing lure where said method comprises the following steps:
    (a) bore a tritium module cavity into a hard, translucent fishing lure body having encapsulated therein a lure weight and a fish-hook and line assembly,
    (b) drill an air hole into end of said cavity,
    (c) pour a clear resilient material into said tritium module cavity,
    (d) before said resilient material sets insert and centrally position a tritium capsule into said tritium module cavity, and
    (e) pour a quantity of resilient material into end of cavity to completely fill said cavity and hermetically seal said module.

2. A method for manufacturing a self-illuminating fishing lure where said method comprises the following steps:
    (a) bore a tritium cavity into a translucent fishing lure body having encapsulated therein a lure weight and a fish hook and line assembly,
    (b) deposit on inner surface of said tritium cavity a coating of phosphorus by a deposition means,
    (c) insert into said phosphorus coated tritium cavity a quantity of tritium gas by an insertion means and,
    (d) seal said tritium cavity after said tritium gas is inserted by a hermetic sealing means.

3. A self-illuminating fishing lure comprising a hard translucent fishing lure body having encapsulated therein:
    (a) a light-emitting radioactive substance consisting of a quantity of tritium hermetically encapsulated in a tritium capsule having inside walls coated with phosphorus,
    (b) a lure weight and,
    (c) a fish hook and line assembly.

4. A self-illuminating fishing lure comprising a hard translucent fishing lure body having encapsulated therein:
    (a) a light-emitting radioactive substance consisting of a quantity of tritium hermetically encapsulated in a tritium capsule having inside walls coated with phosphorus and said tritium capsule is encased within a shock absorbing means,
    (b) a lure weight and,
    (c) a fish hook and line assembly.

5. A self-illuminating fishing lure comprising a hard translucent fishing lure body having encapsulated therein:
    (a) a light-emitting radioactive substance consisting of a quantity of tritium hermetically encapsulated in a tritium capsule having inside walls coated with phosphorus and said tritium capsule is encased within a resilient shock absorbing material that completely surrounds said tritium capsule,
    (b) a lure weight and,
    (c) a fish hook and line assembly.

* * * * *